(12) United States Patent
Keast et al.

(10) Patent No.: US 9,989,555 B2
(45) Date of Patent: Jun. 5, 2018

(54) MINIATURE VECTOR SENSOR

(71) Applicant: Ultra Electronics Maritime Systems Inc., Dartmouth (CA)

(72) Inventors: Andrew Keast, Dartmouth (CA); Olivier Beslin, Eastern Passage (CA); Gerard Matthew Mallay, Halifax (CA)

(73) Assignee: Ultra Electronics Maritime Systems Inc., Dartmouth, NS (CA)

( * ) Notice: Subject to any disclaimer, the term of this patent is extended or adjusted under 35 U.S.C. 154(b) by 379 days.

(21) Appl. No.: 14/925,081

(22) Filed: Oct. 28, 2015

(65) Prior Publication Data
US 2017/0122975 A1 May 4, 2017

(51) Int. Cl.
*G01P 15/18* (2013.01)
*G01V 1/18* (2006.01)

(52) U.S. Cl.
CPC ............... *G01P 15/18* (2013.01); *G01V 1/18* (2013.01); *G01V 1/189* (2013.01)

(58) Field of Classification Search
CPC .................................. B06B 1/06; G01V 1/189
See application file for complete search history.

(56) References Cited

U.S. PATENT DOCUMENTS

| | | | | |
|---|---|---|---|---|
| 2,984,111 A | * | 5/1961 | Kritz ..................... | G01P 15/097 310/329 |
| 3,311,873 A | * | 3/1967 | Schloss .................. | G01V 1/189 310/328 |
| 4,017,824 A | * | 4/1977 | Fife .......................... | B06B 1/06 310/337 |

(Continued)

FOREIGN PATENT DOCUMENTS

CN 2814340 9/2006

OTHER PUBLICATIONS

Gupta et al. "Applications of Polymer Matrix Syntactic Foams" (Nov. 2, 2013, DOI:10.1007/s11837-013-0796-8, retrieved from: https://engineering.nyu.edu/composites/sites/engineering.nyu.edu.composites/files/uploads/Journal_Papers/NikhilGupta_Applications% 20of%20Polymer%20Matrix%20Syntactic%Foams.pdf).

(Continued)

*Primary Examiner* — Hovhannes Baghdasaryan
(74) *Attorney, Agent, or Firm* — Rowand LLP (57) ABSTRACT

A vector sensor for use in acoustic instruments is described. The vector sensor includes: a cylindrical bulkhead partition defining a plurality of channels extending longitudinally on a circumferential wall of the bulkhead partition between a first surface and a second surface of the bulkhead partition; first and second cylindrical piezoelectric transducing pieces affixed to the bulkhead partition and extending outwardly as cantilever beams and contained within respective pressure housing capsules. The sensor may include cylindrical foam end pieces fitted over the capsules and having corresponding channels in their outer surfaces that correspond to channels in the bulkhead partition, so as to allow wiring and strength members to pass through. The cylindrical piezoelectric transducing pieces may be formed from a piezoelectric cylindrical tube with a first electrode covering its inner surface and a second electrode on its outer surface. The second electrode may be formed from a plurality of electrically disconnected electrodes spaced around the tube and located towards a fixed end of the tube, leaving a portion of the outer surface near the free end of the tube uncovered.

22 Claims, 5 Drawing Sheets

(56) References Cited

U.S. PATENT DOCUMENTS

| | | | | |
|---|---|---|---|---|
| 4,163,206 A | * | 7/1979 | Hall, Jr. | G01V 1/189 |
| | | | | 310/331 |
| 4,178,577 A | * | 12/1979 | Cini | B06B 1/0655 |
| | | | | 367/159 |
| 4,228,532 A | * | 10/1980 | Sims | B06B 1/0655 |
| | | | | 310/337 |
| 4,827,459 A | * | 5/1989 | Franklin | B06B 1/0655 |
| | | | | 310/337 |
| 4,866,683 A | * | 9/1989 | Phillips | B06B 1/0644 |
| | | | | 29/25.35 |
| 6,275,448 B1 | * | 8/2001 | Kittower | H04R 1/44 |
| | | | | 367/155 |
| 9,360,495 B1 | * | 6/2016 | Goodemote | G01P 15/09 |
| 2010/0028197 A1 | | 11/2010 | McConnell et al. | |

OTHER PUBLICATIONS

CIPO, Examiner's Report relating to Application No. 2,944,884 dated Aug. 23, 2017.

* cited by examiner

MINIATURE VECTOR SENSOR

TECHNICAL FIELD

The present disclosure relates to vector sensors and, in particular, to a miniature vector sensor for use in underwater acoustic devices.

BACKGROUND

Vector sensors measure scalar pressure and acoustic particle velocity of sound waves. In contrast to conventional omnidirectional hydrophones, vector sensors are capable of providing directivity information. U.S. Pat. No. 4,827,459 proposed an accelerometer for use in underwater acoustic sensors. The accelerometer includes a pair of piezoelectric crystals capable of generating orthogonal voltage signals in response to translational motion of the acoustic sensor, from which signals crossed dipole directivity patterns can be obtained.

Miniaturization of vector sensors can pose challenges relating to physical arrangement of sensor components, control of resonance effects and reducing the density of the sensor.

BRIEF DESCRIPTION OF DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

The present application describes a vector sensor for use in acoustic measurements. The vector sensor may include a generally cylindrical bulkhead partition having a plurality of longitudinal channels formed in its cylindrical outer surface and first and second cylindrical piezoelectric transducing pieces affixed to the bulkhead partition and extending outwardly as cantilever beams and contained within respective pressure housing capsules.

In some embodiments, the sensor may include cylindrical foam end pieces fitted over the capsules and having longitudinal channels in their outer surfaces that correspond to channels in the bulkhead partition, so as to allow wiring and strength members to pass by the sensor when placed in a linear array of vector sensors, such as in a towed array configuration.

In some embodiments, the cylindrical piezoelectric transducing pieces may be formed from a piezoelectric cylindrical tube with a first electrode covering its inner surface and a second electrode on its outer surface. The second electrode may be formed from a plurality of electrically disconnected electrodes spaced around the tube and located towards a fixed end of the tube, leaving a portion of the outer surface near the free end of the tube uncovered.

In one aspect, the present disclosure describes a vector sensor. The vector sensor includes a bulkhead partition. The bulkhead partition has a generally cylindrical shape defined by a first surface and a second surface opposite to the first surface with a circumferential wall between the first surface and the second surface. The circumferential wall defines a plurality of channels extending longitudinally between the first surface and the second surface. The vector sensor also includes a first cylindrical piezoelectric transducing piece affixed to the first surface of the bulkhead partition and a second cylindrical piezoelectric transducing piece affixed to the second surface of the bulkhead partition. The first and second cylindrical piezoelectric transducing pieces extend outwardly from the first and second surfaces, respectively, as cantilever beams. The vector sensor further includes a first pressure housing capsule affixed to the first surface of the bulkhead partition and a second pressure housing capsule affixed to the second surface of the bulkhead partition. The first and second pressure housing capsules fit over and contain the first and second cylindrical piezoelectric transducing pieces, respectively.

In another aspect, the present disclosure describes an underwater acoustic measurement system. The underwater acoustic measurement system includes a plurality of vector sensors. Each vector sensor includes a bulkhead partition. The bulkhead partition has a generally cylindrical shape defined by a first surface and a second surface opposite to the first surface with a circumferential wall between the first surface and the second surface. The circumferential wall defines a plurality of channels extending longitudinally between the first surface and the second surface. Each vector sensor also includes a first cylindrical piezoelectric transducing piece affixed to the first surface of the bulkhead partition and a second cylindrical piezoelectric transducing piece affixed to the second surface of the bulkhead partition. The first and second cylindrical piezoelectric transducing pieces extend outwardly from the first and second surfaces, respectively, as cantilever beams. Each vector sensor further includes a first pressure housing capsule affixed to the first surface of the bulkhead partition and a second pressure housing capsule affixed to the second surface of the bulkhead partition. The first and second pressure housing capsules fit over and contain the first and second cylindrical piezoelectric transducing pieces, respectively. The underwater acoustic measurement system also includes one or more strength members holding the vector sensors in a linear array. Each vector sensor in the linear array is spaced apart from an adjacent vector sensor by a respective distance and each of the strength members passes through a respective one of the plurality of channels of each vector sensor.

Other example embodiments of the present disclosure will be apparent to those of ordinary skill in the art from a review of the following detailed descriptions in conjunction with the drawings.

Figure 1:
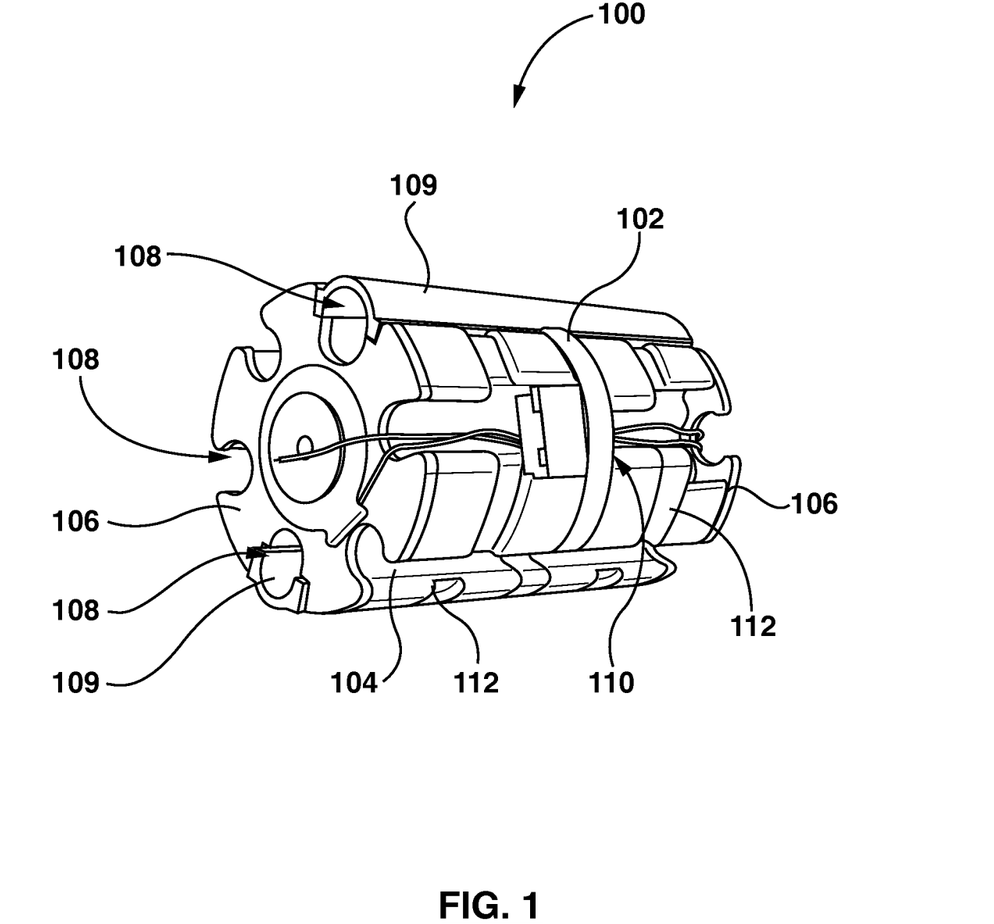
FIG. 1 shows a perspective view of an example vector sensor in accordance with one example embodiment.

Reference is now made to FIG. 1, which shows a perspective view of an example vector sensor 100. The vector sensor 100 includes a bulkhead partition 102, a pair of foam end pieces 104 attached to opposite surfaces of the bulkhead partition 102, and a pair of end plates 106 affixed to the foam end pieces 104. In the example illustrated in FIG. 1, the bulkhead partition 102 and each of the foam end pieces 104 are generally cylindrical. The foam end pieces 104 may be identical in size and shape. In particular, the foam end pieces 104 may have the same length and the same cross-sectional diameter. The foam end pieces 104 are symmetrically attached to opposite surfaces of the bulkhead partition 102. For each foam end piece 104, an end plate 106 is affixed to the end of the foam end piece 104 which is distant from a surface of the bulkhead partition 102. The bulkhead partition 102, foam end pieces 104 and end plates 106 will be described in greater detail below.

The vector sensor 100 also includes a pair of cylindrical piezoelectric transducing pieces (not shown) and a pair of pressure housing capsules (not shown), symmetrically affixed to opposite surfaces of the bulkhead partition 102. Each cylindrical piezoelectric transducing piece extends outwardly from a respective surface of the bulkhead partition 102 as a cantilever beam. A pressure housing capsule fits over each cylindrical piezoelectric transducing piece, enclosing a space containing the cylindrical piezoelectric transducing piece. These components of the vector sensor 100 will be described in greater detail below with reference to FIGS. 3 and 6.

Longitudinally-extending channels 108 are formed in the cylindrical exterior of the vector sensor 100. The longitudinal channels 108 extend parallel to the central axis of the vector sensor 100. In this example, a plurality of channels 108 are spaced around the exterior of the vector sensor 108. It will be appreciated that most of the channels 108 extend through the end plates 106, the foam end pieces 104 and the bulkhead partition 102 to create a complete passageway along the length of the vector sensor 100 through which cables, wiring, ropes, strength members, or the like might pass. Although the present embodiment shows six channels 108, other embodiments may include more or fewer channels 108.

In this example embodiment, one of the channels 108 is interrupted by the lack of a corresponding cutout in the bulkhead partition 102, as indicated by reference numeral 110. This portion of the bulkhead partition 102 may support a wiring connector or port for connection to one or more wires routed through that channel to connect to electronics mounted to the bulkhead partition 102 as a part of the vector sensor 100.

In some instances the channels 108 may have corresponding covers 109 that physically protect the wires routed through the channel. The covers 109 may have a push-fit or snap-fit engagement with the foam end pieces 104 or the bulkhead partition 102 or both.

The vector sensor 100 is for use in, for example, a towed array in which a plurality of vector sensors 100 are axially aligned and spaced apart in a one-dimensional array. The vector sensors 100 may be placed within a hose or other sheath. Inside the sheath the vector sensors 100 may be held in spaced relation by two or more strength members, such as cables or ropes, running the length of the sheath and each passing through a respective channel of each of the vector sensors 100. A strap or other securing member may be used to cinch or secure the vector sensor 100 to the strength members passing through respective channels. In some embodiments, as illustrated in FIG. 1, an annular groove 112 may be formed in one or both of the foam end members 104 to accommodate the strap or other securing member. An example strap is a cable tie, but other such securing members may be used in other embodiments. In some examples, the overall diameter of the towed array may range from 50 mm to 100 mm, although it may be smaller or larger in some embodiments.

Figure 2:
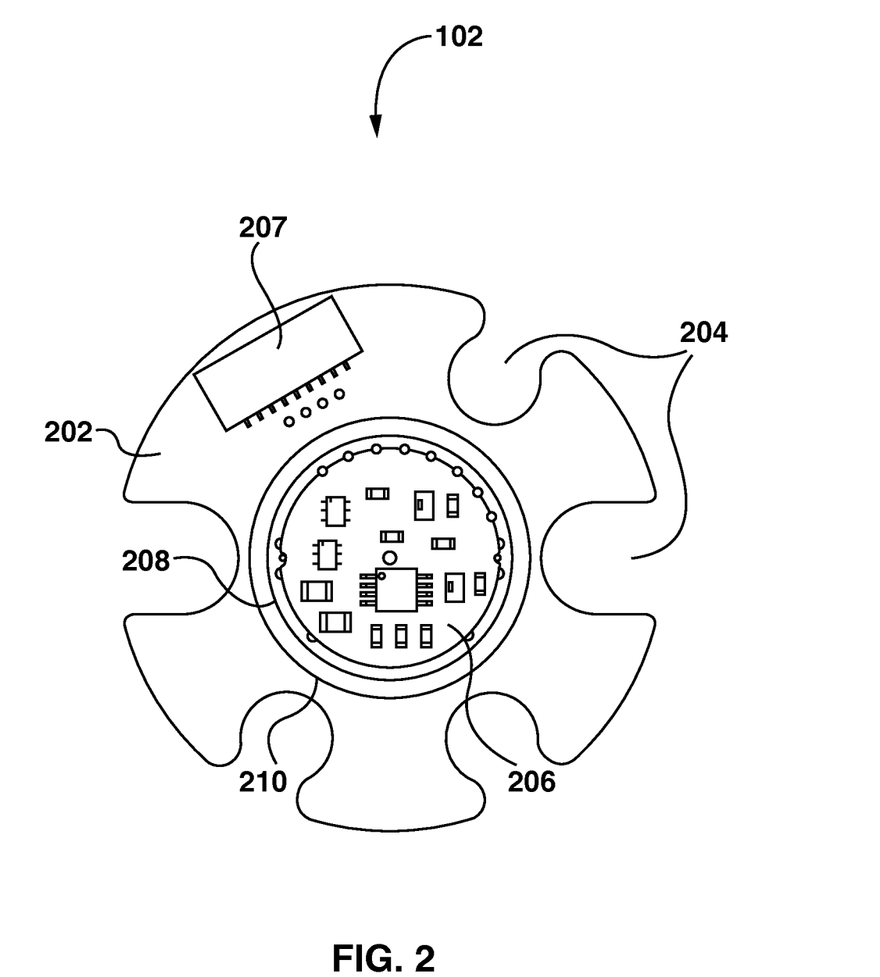
FIG. 2 shows a front view of a surface of one example embodiment of a bulkhead partition.

A front view of a surface 202 of one example of the bulkhead partition 102 is shown in FIG. 2. The bulkhead partition 102 is centrally located within the vector sensor 100 and supports a plurality of components of the vector sensor 100. The bulkhead partition 102 is generally cylindrical, having a first surface, a second surface that is opposite to the first surface and a circumferential wall extending between the first surface and the second surface. The circumferential wall of the bulkhead partition 102 defines a plurality of channels 204 that extend longitudinally between the surfaces of the bulkhead partition 102. In FIG. 2, the example channels 204 are shown as nearly-circular or semi-circular sections that have been cutout from the perimeter of the bulkhead partition 102. The cutout sections are distributed in circumferentially spaced relation about the center of the surface 202. That is, each cutout section is spaced apart from an adjacent cutout section along the circumference of the bulkhead partition 102.

The bulkhead partition 102 also includes a printed circuit board (PCB) portion 206. The PCB portion 206 includes a circuit board layer printed at corresponding positions on each surface of the bulkhead partition 102. The PCB layer is centrally located on the surfaces of the bulkhead partition 102. For example, as shown in FIG. 2, the PCB layer may be disposed on a delimited area that is generally centered on the surface 202 of the bulkhead partition 102. The PCB portion 206 may provide electrical connection between pads or electronic components located on the bulkhead partition 102. Furthermore, the PCB portion 206 may define one or more through-holes for providing passage to electrical wiring through the bulkhead partition 102. In particular, electrical wiring in the vector sensor 100 may be routed through the through-holes defined by the PCB portion 206, extending at least partially on both sides of the bulkhead partition 102. The bulkhead partition 102 may also include a pin connector 207 disposed on at least one surface of the bulkhead partition 102.

In some embodiments, the bulkhead partition 102 may define one or more grooves to aid in accurate positioning of vector sensor components on the surfaces of the bulkhead partition 102. In the example shown in FIG. 2, the bulkhead partition 102 defines two concentric grooves, 208 and 210 on the surface 202. The grooves 208 and 210 may be used to demarcate the positions at which a cylindrical piezoelectric transducing piece and a pressure housing capsule may be affixed to the surface 202. In particular, the first groove 208 may be sized to fit one end of a cylindrical piezoelectric transducing piece when affixed to the surface 202, and the second groove 210 be sized to fit a cylindrical end of a pressure housing capsule affixed to the surface 202.

Figure 3:
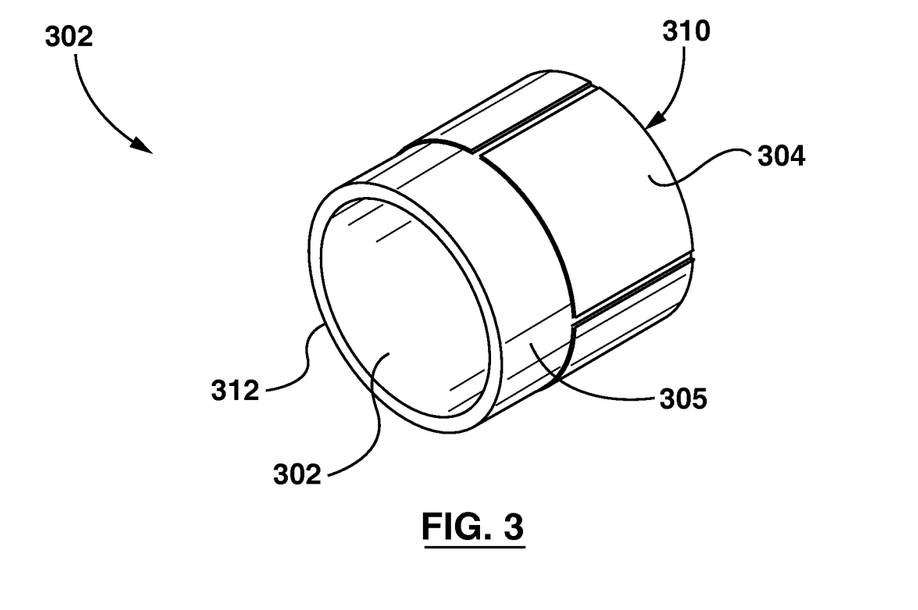
FIG. 3 shows a perspective view of an example of a cylindrical piezoelectric transducing piece.

Reference is now made to FIG. 3, which shows a perspective view of an example of a cylindrical piezoelectric transducing piece 300. The cylindrical piezoelectric transducing piece 300 in this example includes a cylindrical tube made of a piezoelectric material. The tube includes an outer surface 305 (the surface of the outer wall of the tube) and an inner surface (the surface of the inner wall of the tube). A plurality of electrodes are affixed to the surfaces of the tube. The electrodes are capable of generating voltage signals in response to motion or bending stresses experienced by the piezoelectric material. Voltage signals produced as a result of such stresses may allow directivity patterns to be obtained. An inner electrode 302 covers at least a portion of the inner surface of the piezoelectric tube and a plurality of outer electrodes 304 cover at least a portion of the outer surface 305 of the piezoelectric tube. The piezoelectric material may be a ceramic material, such as lead zirconate titanate (PZT), for example. In some examples, the piezoelectric material may be magnesium niobate (PMN)-lead titanate (PT) crystal. Other piezoelectric material may be used suitable to a particular application.

In at least some embodiments, the inner electrode 302 is a continuous electrode that completely covers the inner surface of the piezoelectric tube. The inner electrode 302 may be a single electrode layer coating the inner surface of the cylindrical piezoelectric transducing piece 300. The outer electrodes 304 consist of two or more electrode segments. In the present example, four electrode segments of equal size are affixed to the outer surface 305 of the cylindrical piezoelectric transducing piece 300. The segmentation of outer electrodes 304 permits signal reinforcement from opposite quadrants when opposite sides of the cylindrical piezoelectric transducing piece experience bending stresses. Each outer electrode 304 is separated from an adjacent outer electrode 304 by a respective gap. The outer electrodes 304 are disposed in such a way as to wrap around the circumference of the outer surface 305, yet may be shorter in a longitudinal direction than the length of the piezoelectric tube, thereby leaving a part of one end of the outer surface 205 of the tube uncovered by the outer electrodes 304. In at least some embodiments, the outer electrodes 304 may be aligned with and extend from a fixed end 310 of the outer surface 305 towards a free end 312 on the outer surface 305, but are shorter than the length of the tube, leaving an exposed section of the outer surface 305.

In use, the cylindrical piezoelectric transducing pieces 300 are mounted to respective surfaces of the bulkhead partition 102 (FIG. 1) and are enclosed within (and protected by) respective pressure housings attached to the bulkhead partition 102.

Figure 4:
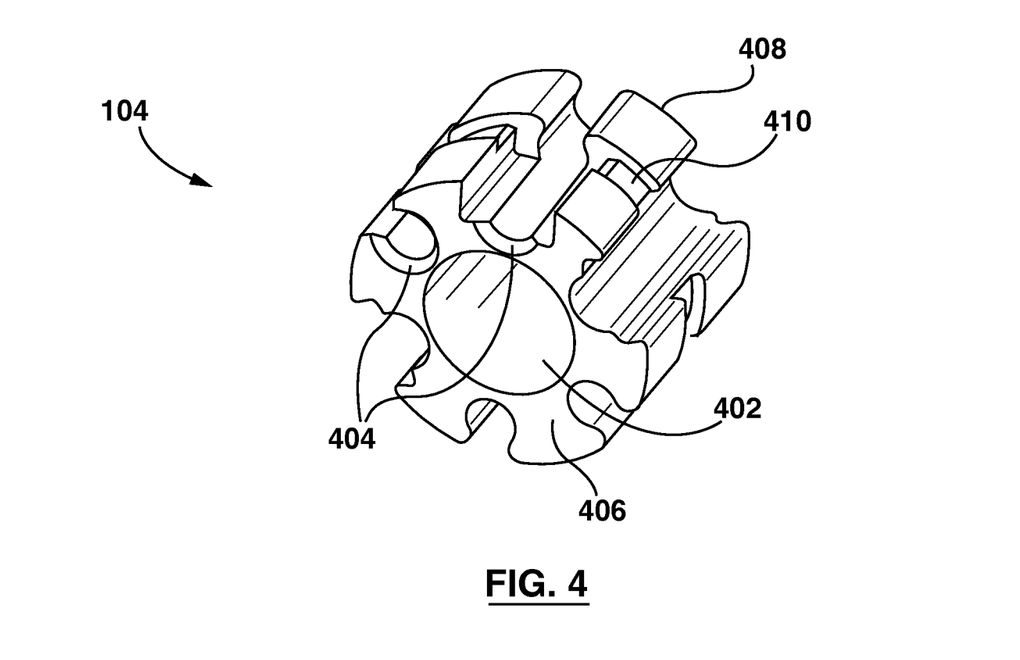
FIG. 4 shows a perspective view of an example of a foam end piece.

FIG. 4 shows a perspective view of one example of the foam end piece 104. In some embodiments, the vector sensor 100 (FIG. 1) includes foam end pieces 104 attached to either side of the bulkhead partition 102 and which surround respective pressure housings.

The foam end piece 104 is constructed of syntactic foam or other lightweight polymer composite material. Accordingly, the foam end pieces 104 may assist in achieving neutral buoyancy.

The foam end piece 104 is generally cylindrical and will be attached at one of its ends to a surface of the bulkhead partition 102 (FIG. 1). The foam end piece 104 has a first face 406, a second face 408 opposite to the first face 406, and a circumferential surface extending between the first face 406 and the second face 408. As mentioned above, each foam end piece 104 defines a plurality of foam channels 404 in the circumferential surface that extend longitudinally between the first face 406 and the second face 408. The foam channels 404 are distributed along the outer perimeter of the foam end piece 104 in spaced relation about the central axis of the foam end piece 104.

In some embodiments, the foam end piece 104 includes an annular groove 410 to accommodate a cable tie or other securing member cinching the foam end piece 104 to one or more strength members (e.g. ropes or cables) passing through one or more respective channels 404.

In at least some embodiments, at least one of the foam end pieces 104 defines a rectangular cutout portion on the outer surface of the foam end piece 104 to accommodate a pin connector that mates with the connector 207 (FIG. 2) disposed on the bulkhead partition 102 (FIG. 2). The pin connector 207 provide electrical connection to the electronic components attached to the bulkhead partition 102 and located inside the pressure housing capsules (not shown).

The foam end piece 104 further includes a central bore 402. The central bore 402 is sized to fit over a pressure housing capsule (not shown) that is centrally affixed to a surface of the bulkhead partition 102 when the foam end piece 104 is attached to the surface of the bulkhead partition 102. That is, when the pressure housing capsule is affixed to the bulkhead partition 102, the pressure housing capsule sits inside the central bore 402. In at least some embodiments, the outer surface of the pressure housing capsule may rest against the wall of the central bore 402 when the foam end piece 104 is attached to the bulkhead partition 102. The foam end piece 104 may thus serve to support and reinforce the walls of the pressure housing capsule, pushing unwanted resonances out-of-band.

Figure 5:
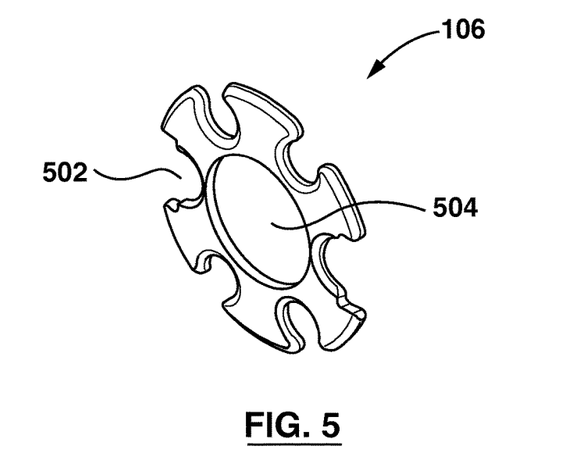
FIG. 5 shows a perspective view of one example of an end plate.

Reference is now made to FIG. 5, which shows one example of the end plate 106. In some embodiments, the end plate 106 is constructed of aluminum. The end plates 106 provide a protective layer for each of the foam end pieces 104 (FIG. 1) and increased control of device resonance and sensitivity. The end plates 106 may be attached to the foam end pieces 104 by using an adhesive, such as Epoxy HYSOL 9460. As can be seen in FIGS. 1 and 5, the cross-section of the end plate 106 matches the cross-section of the corresponding foam end piece 104. In particular, the cross-section of the end plate 106 defines a plurality of cutout sections 502 along its perimeter and a centrally positioned end plate hole 504, which correspond in shape and location to the foam channels 404 (FIG. 4) and the central bore 402 (FIG. 4), respectively, of the foam end piece 104 to which the end plate 106 is attached.

Figure 6:
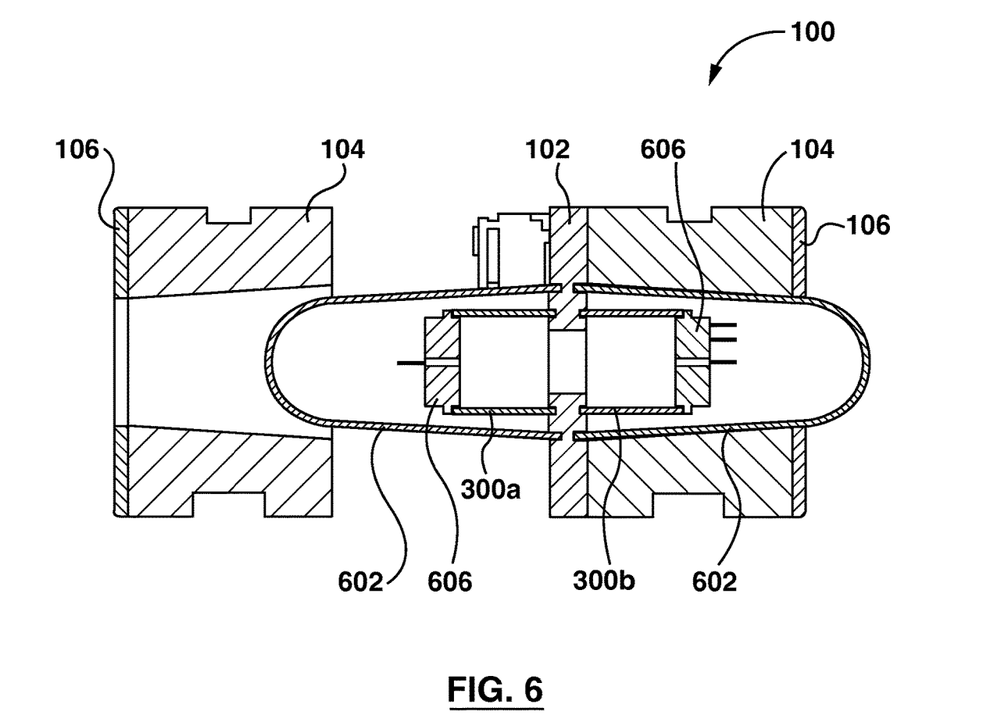
FIG. 6 shows, in cross-sectional view, a partially-assembled vector sensor according to an example embodiment.

FIG. 6 shows a side cross-sectional view of one example embodiment of a partially-assembled vector sensor 100. The bulkhead partition 102 is centrally located in the vector sensor 100 and a pair of cylindrical piezoelectric transducing pieces 300 (labelled individually as 300a, 300b) are affixed to opposite surfaces of the bulkhead partition 102. More specifically, a first cylindrical piezoelectric transducing piece 300a is affixed to the first surface of the bulkhead partition 102 and a second cylindrical piezoelectric transducing piece 300b is affixed to the second surface (opposite to the first surface) of the bulkhead partition 102. The first and second cylindrical piezoelectric transducing pieces 300 extend outwardly from the first and second surfaces of the bulkhead partition 102, respectively, as cantilever beams. A mass 606 may be attached to the free end of each of the cylindrical piezoelectric transducing pieces 300. In some instances the masses 606 may be attached by way of an axial through-bolt (not shown) which may not be connected to the bulkhead partition 102. Other attachment mechanisms may be used in other embodiments.

A pair of pressure housing capsules 602 are symmetrically affixed to the opposite surfaces of the bulkhead partition 102. More specifically, a first pressure housing capsule is affixed to the first surface of the bulkhead partition 102 and a second pressure housing capsule is affixed to the second surface of the bulkhead partition 102. In this example, the pressure housing capsules 602 have a generally conical shape. Each pressure housing capsule 602 fits over and encloses a space containing one of the cylindrical piezoelectric transducing pieces 300 such that the enclosed space is air-filled and remains nominally at atmospheric pressure. The conical shape of the pressure housing capsule 602 may facilitate attachment of the foam end pieces 104.

Each of the cylindrical piezoelectric transducing pieces 300 is spaced apart from the inner wall of the corresponding pressure housing capsule 602 when the cylindrical piezoelectric transducing pieces 300 and the pressure housing capsules 602 are affixed to the opposite surfaces of the bulkhead partition 102. The foam end pieces 104 fit over the pressure housing capsules 602 and are affixed to the bulkhead partition 102.

Figure 7:
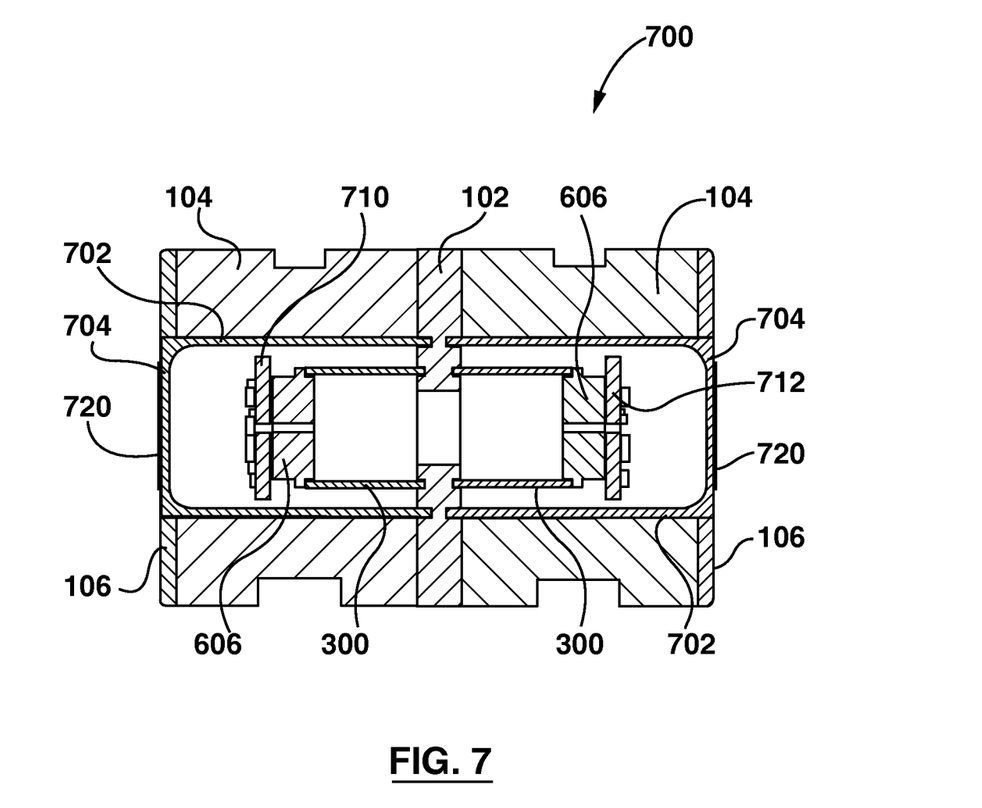
FIG. 7 shows, in cross-sectional view, an assembled vector sensor according to another example embodiment.

Reference is now made to FIG. 7, which shows a cross-sectional view one example embodiment of an assembled vector sensor 700. The assembled vector sensor 700 includes the bulkhead partition 102, the foam end pieces 104 and the cylindrical piezoelectric transducing pieces 300. In this example embodiment, the vector sensor 700 includes generally cylindrical pressure housing capsules 702. The generally cylindrical pressure housing capsules 702 each have an end wall 704 distant from the bulkhead partition 102 and the outer face of which is flush with the outside face of the end plates 106.

In this example embodiment, the vector sensor 700 further includes internal electronics boards 710 and 712 that are mounted to the masses 606, rather than being mounted to the bulkhead partition 102. Wiring for connecting the electronics boards 710 and 712 to a pin connector (not shown) may run outside of or through the cylindrical tube of the cylindrical piezoelectric transducing piece 300 and into the bulkhead partition 102 to be routed to the exterior of the vector sensor 700.

In this embodiment, the vector sensor 700 also includes a pair of omnidirectional pressure sensors 720 affixed to the end walls 704 of the pressure housing capsules 702. The omnidirectional pressure sensors 720 may be ceramic discs or hemispheres. Electrical wiring connecting the pressure sensors 720 disposed on opposite surfaces of the vector sensor 100 may be externally routed through the sensor channels 108 (FIG. 1) to reach the pin connector or other electrical connections points within or on the vector sensor 700. The voltage signals generated by the omnidirectional pressure sensors 720 may be processed to compute both the mean acoustic pressure at the center of the respective pressure sensors and the acoustic pressure gradient along the main axis of the vector sensor 700 (i.e. the axis that is collinear with the axis of the cylindrical piezoelectric transducing pieces 300). The acoustic pressure gradient along the main axis of the vector sensor 700 is proportional to the acoustic particle acceleration along the main axis. Therefore, a three-dimensional acoustic particle vector sensor may be realized by processing the voltage signals generated by the omnidirectional pressure sensors 720 and the electrodes of the cylindrical piezoelectric transducing pieces 300. This three-dimensional vector sensor may be able to sense the acoustic particle acceleration along three perpendicular axes (i.e. along the main axis of the vector sensor and along two mutually perpendicular axes that are perpendicular to the main axis of the vector sensor).

The various embodiments presented above are merely examples and are in no way meant to limit the scope of this disclosure. Variations of the innovations described herein will be apparent to persons of reasonable skill in the art, such variations being within the intended scope of the present application. In particular, features from one or more of the above-mentioned embodiments may be selected to create alternative embodiments comprising a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter herein and in the recited claims intends to cover and embrace all suitable changes in technology.

Certain adaptations and modifications of the described embodiments can be made. Therefore, the above discussed embodiments are considered to be illustrative and not restrictive.

The invention claimed is:

1. A vector sensor, comprising:
a bulkhead partition having a generally cylindrical shape defined by a first surface and a second surface opposite to the first surface with a circumferential wall between the first surface and the second surface, the circumferential wall defining a plurality of channels extending longitudinally between the first surface and the second surface;
a first cylindrical piezoelectric transducing piece affixed to the first surface of the bulkhead partition and a second cylindrical piezoelectric transducing piece affixed to the second surface of the bulkhead partition, the first and second cylindrical piezoelectric transducing pieces extending outwardly from the first and second surfaces, respectively, as cantilever beams;
a first pressure housing capsule affixed to the first surface of the bulkhead partition and a second pressure housing capsule affixed to the second surface of the bulkhead partition, the first and second pressure housing capsules fitting over and containing the first and second cylindrical piezoelectric transducing pieces, respectively; and
a first foam end piece and a second foam end piece, each foam end piece having a first face and a second face opposite to the first face and having a generally cylindrical shape of diameter similar to a diameter of the bulkhead portion, wherein each foam end piece defines a central bore sized to be attached to a respective one of the pressure housing capsules when the foam end piece is attached to the bulkhead partition.

2. The vector sensor of claim 1, wherein the first foam end piece and the second foam end piece are constructed of syntactic foam.

3. The vector sensor of claim 1, further comprising a first metal end plate affixed to the first foam end piece and a second metal end plate affixed to the second foam end piece, each end plate being affixed at the face of the corresponding foam end piece distant from the bulkhead partition.

4. The vector sensor of claim 3, wherein a circumferential profile of each of the metal end plates matches a circumferential profile of its corresponding foam end piece.

5. The vector sensor of claim 1, wherein each foam end piece has a circumferential surface that defines a plurality of foam channels extending longitudinally between the first face and the second face and wherein the foam channels are aligned with the plurality of channels in the bulkhead partition to provide a plurality of continuous channels extending along a length of the vector sensor.

6. The vector sensor of claim 5, wherein two or more of the plurality of continuous channels are sized to contain one or more strength members extending longitudinally along an exterior surface of the vector sensor.

7. The vector sensor of claim 6, wherein at least one of the foam end pieces includes a annular channel within its circumferential surface to contain a securing member to cinch the vector sensor to a strength member within one of the continuous channels.

8. The vector sensor of claim 1, wherein the bulkhead partition includes a printed circuit board portion.

9. The vector sensor of claim 8, wherein the printed circuit board portion provides passage to electrical wiring through the bulkhead partition.

10. The vector sensor of claim 1, wherein the cylindrical piezoelectric transducing pieces each comprise a cylindrical tube formed of piezoelectric material.

11. The vector sensor of claim 10, wherein each cylindrical piezoelectric transducing piece further comprises an inner electrode on an inner surface of the cylindrical tube and a plurality of outer electrodes affixed to a portion of an outer surface of the cylindrical tube.

12. The vector sensor of claim 11, wherein the plurality of outer electrodes comprise four electrode segments spaced apart circumferentially around the cylindrical tube.

13. The vector sensor of claim 11, wherein the inner electrode covers the inner surface of the cylindrical piezoelectric transducing piece.

14. The vector sensor of claim 12, wherein the cylindrical tube includes a fixed end for attachment to the bulkhead partition and a free end, and wherein the plurality of outer electrodes are positioned adjacent the fixed end of the outer surface of the cylindrical piezoelectric transducing piece and having a length extending from the fixed end towards the free end, and wherein the length of the outer electrodes is shorter than the length of the cylindrical tube.

15. The vector sensor of claim 14, further comprising a first mass affixed to the free end of the first cylindrical piezoelectric transducing piece and a second mass affixed to the free end of the second cylindrical piezoelectric transducing piece, the first mass and the second mass being spaced apart from inner walls of the first pressure housing capsule and the second pressure housing capsule, respectively.

16. The vector sensor of claim 15, further comprising a first internal electronics board and a second internal electronics board mounted to the first mass and the second mass, respectively.

17. The vector sensor of claim 1, wherein each of the pressure housing capsules has a generally conical shape.

18. The vector sensor of claim 1, further comprising a first omnidirectional pressure sensor attached to the first pressure housing capsule and a second omnidirectional pressure sensor attached to the second pressure housing capsule, each pressure sensor being attached at an end of the corresponding pressure housing capsule that is not affixed to the bulkhead partition.

19. The vector sensor of claim 18, wherein voltage signals generated by the omnidirectional pressure sensors are processed to compute a mean acoustic pressure at a center of each respective pressure sensor and an acoustic pressure gradient along a central axis of the vector sensor.

20. An underwater acoustic measurement system, comprising:
a plurality of vector sensors, each vector sensor including:
a bulkhead partition having a generally cylindrical shape defined by a first surface and a second surface opposite to the first surface with a circumferential wall between the first surface and the second surface, the circumferential wall defining a plurality of channels extending longitudinally between the first surface and the second surface,
a first cylindrical piezoelectric transducing piece affixed to the first surface of the bulkhead partition and a second cylindrical piezoelectric transducing piece affixed to the second surface of the bulkhead partition, the first and second cylindrical piezoelectric transducing pieces extending outwardly from the first and second surfaces, respectively, as cantilever beams,
a first pressure housing capsule affixed to the first surface of the bulkhead partition and a second pressure housing capsule affixed to the second surface of the bulkhead partition, the first and second pressure housing capsules fitting over and containing the first and second cylindrical piezoelectric transducing pieces, respectively; and
a first foam end piece and a second foam end piece, each foam end piece having a first face and a second face opposite to the first face and having a generally cylindrical shape of diameter similar to a diameter of the bulkhead portion, wherein each foam end piece defines a central bore sized to be attached to a respective one of the pressure housing capsules when the foam end piece is attached to the bulkhead partition; and
one or more strength members holding the vector sensors in a linear array, wherein each vector sensor in the linear array is spaced apart from an adjacent vector sensor by a respective distance and wherein each of the strength members passes through a respective one of the plurality of channels of each vector sensor.

21. The underwater acoustic measurement system of claim 20, wherein the one or more strength members comprises ropes.

22. The underwater acoustic measurement system of claim 21, further comprising a sheath enveloping the one or more strength members and the plurality of vectors sensors to form a towed array.

* * * * *